H. A. SMITH.
HAY RAKE.
APPLICATION FILED OCT. 17, 1907.
930,994.
Patented Aug. 10, 1909.
4 SHEETS—SHEET 1.
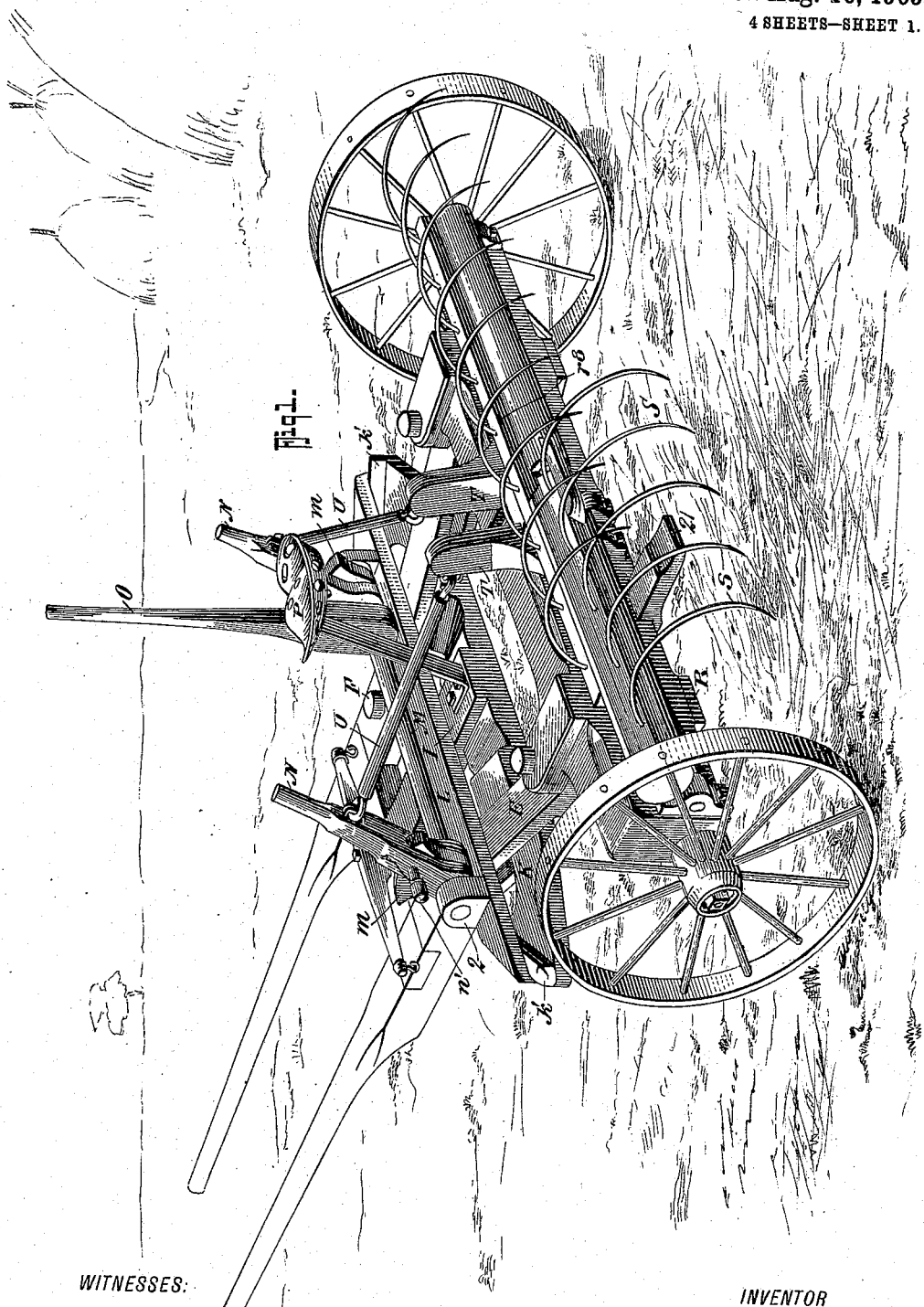
WITNESSES:
John T. Schrott
Charles Wagner
INVENTOR
Henry A. Smith.
BY
Fred G. Dieterich
ATTORNEYS.

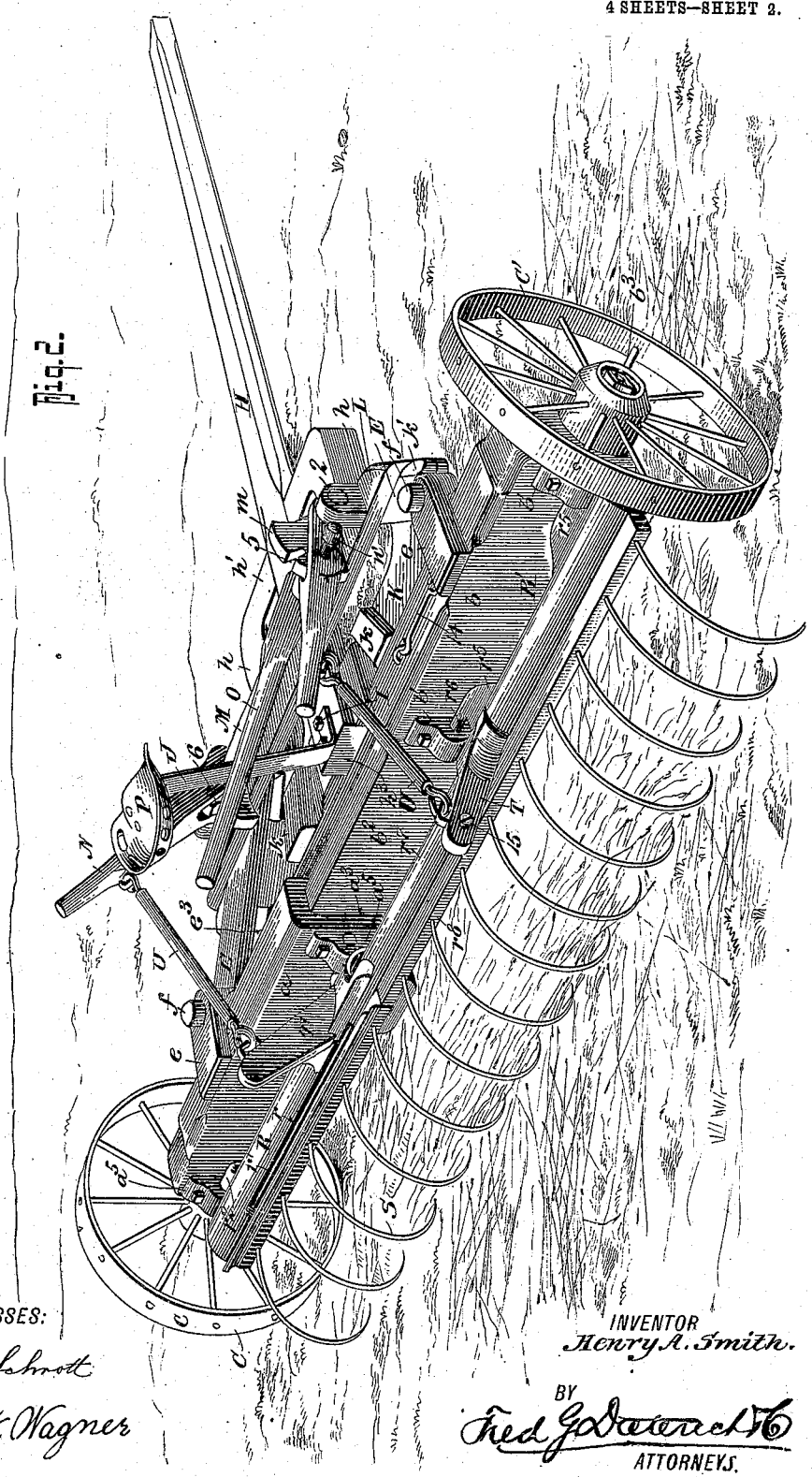

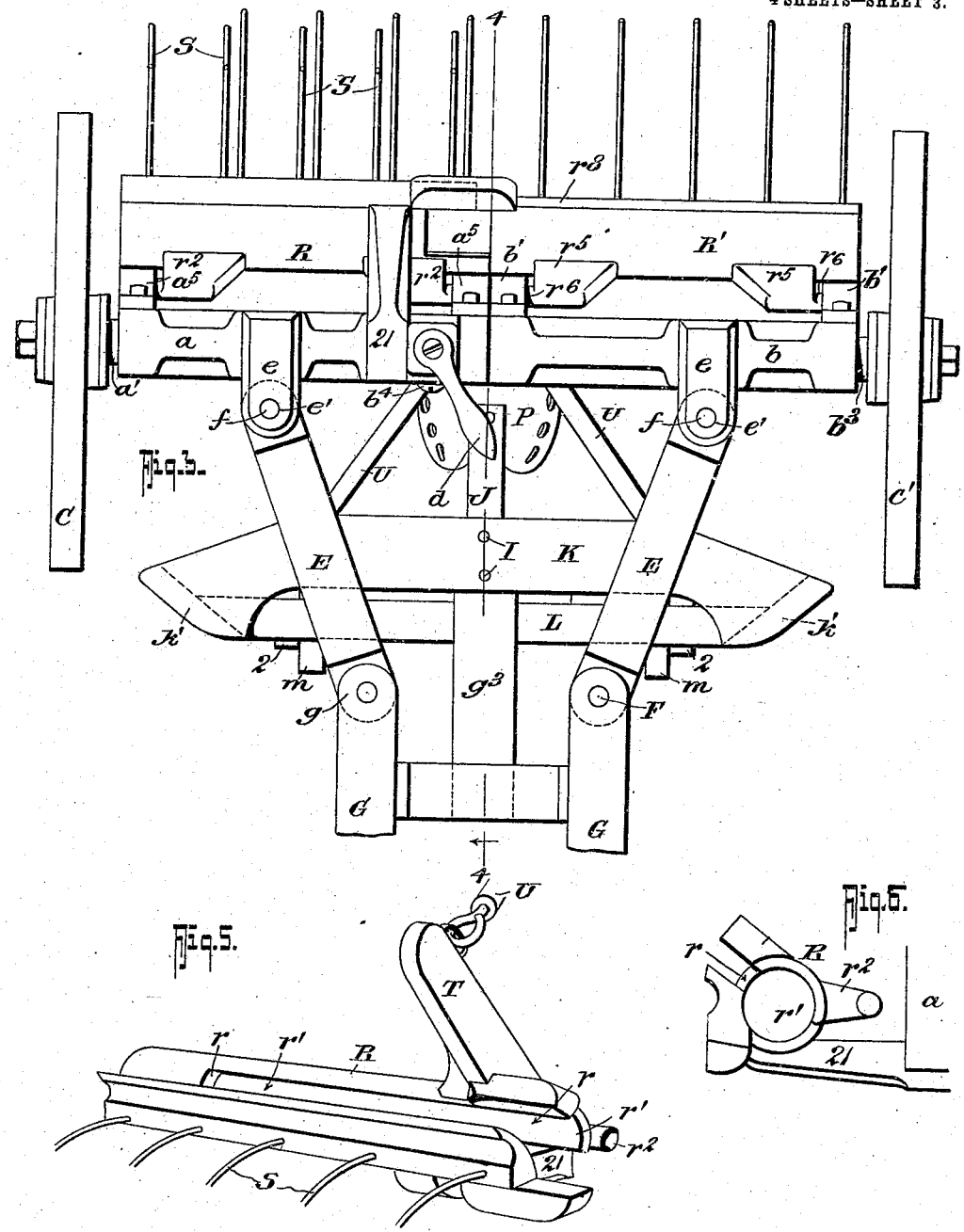

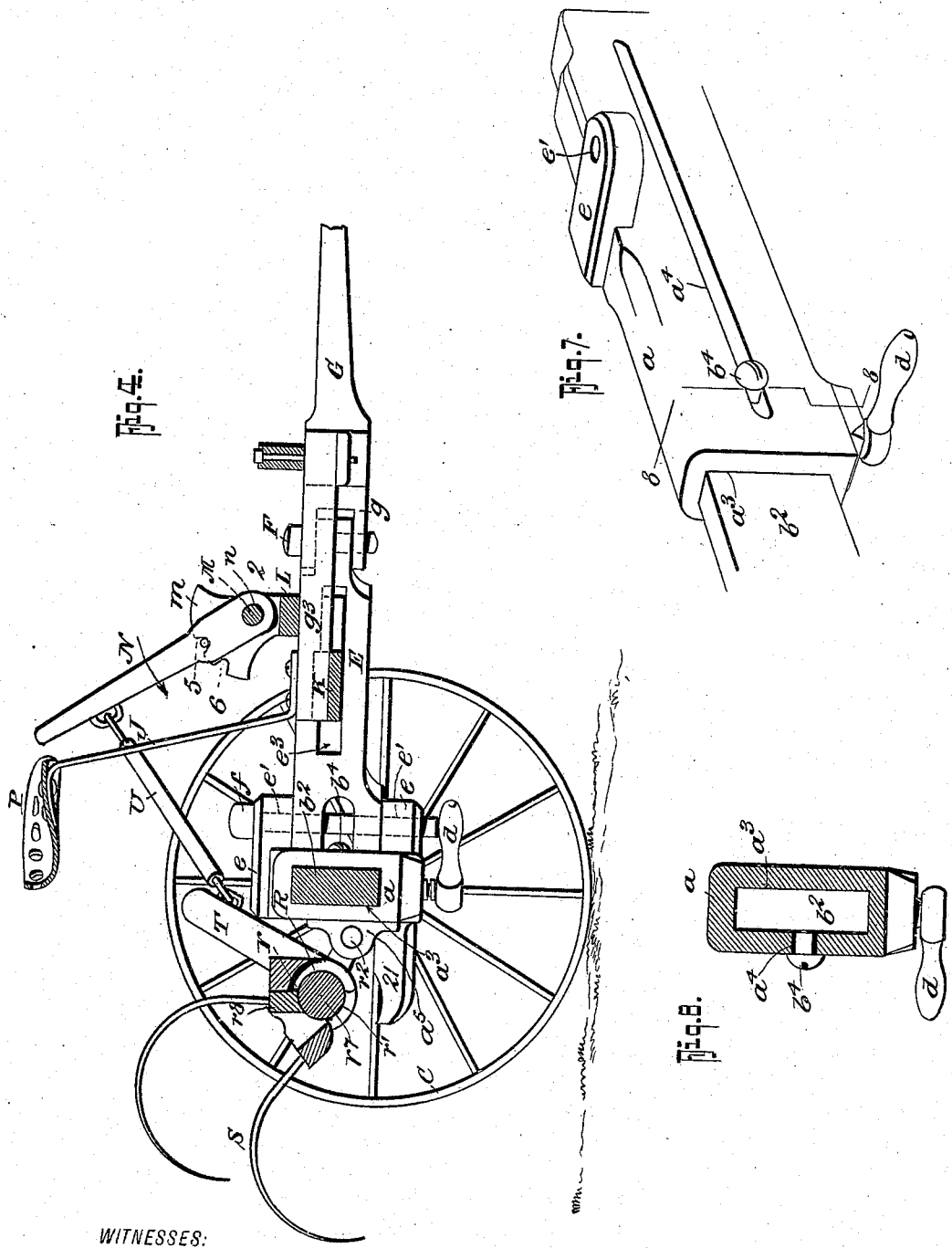

UNITED STATES PATENT OFFICE.

HENRY A. SMITH, OF GURLEY, ALABAMA.

HAY-RAKE.

No. 930,994.　　　　Specification of Letters Patent.　　　Patented Aug. 10, 1909.

Application filed October 17, 1907. Serial No. 397,835.

*To all whom it may concern:*

Be it known that I, HENRY A. SMITH, residing at Gurley, in the county of Madison and State of Alabama, have invented a new and Improved Hay-Rake, of which the following is a specification.

My invention, which relates generally to improvements in sulky hay rakes, is more particularly in the nature of an improved adjustable hay rake, of that character, which may be compactly arranged for being transported through narrow spaces, country roads and gates, over and between which the ordinary types of wagons may be drawn, and that can be readily extended to its full width and used in either adjustment.

My invention primarily seeks to provide an improved rake of the character stated, of a simple construction, in which the several parts are arranged and capable of being combined in such manner as to render their construction economical and in which the operation of extending or folding up the rake head sections can be conveniently and quickly accomplished.

Another object of my invention is to provide an adjustable rake in which the several parts are so combined whereby they can be coöperatively connected either with shafts for a single horse or a tongue for a double team, and which can be readily detachably connected with the rake frame.

With the above and other objects in view, my invention in its generic nature, comprehends a two part telescopically joined axle, telescopically connected rake heads, rockably mounted on the said axle parts, a draft frame, link arms connecting the axle parts with the said frame and an improved arrangement of lever devices, whereby the rake heads may be adjusted to an operative or inoperative position, and when thus adjusted, raised or lowered, as desired.

In its more subordinate features, my invention consists in certain details of construction and novel arrangement of parts, all of which will be hereinafter fully described, specifically pointed out in the appended claims, and illustrated in the accompanying drawings, in which:—

Figure 1, is a perspective view of my improved rake, the parts being to the compact or folded adjustment, and the draft devices arranged for one horse. Fig. 2, is a similar view of the rake extended, and the draft devices arranged for a two horse team. Fig. 3, is a bottom plan view of the rake, the parts being closed in. Fig. 4, is a longitudinal section of the rake, taken substantially on the line 4—4 on Fig. 3. Fig. 5, is a detail perspective view of one end of the rake heads, shown to their lowered or raking position. Fig. 6, is an end view of a portion of the part shown in Fig. 5. Fig. 7, is a detail perspective view that illustrates the slot and stop screw for limiting the outward adjustment of the axle and rake heads. Fig. 8, is a cross section on the lines 8—8 on Fig. 2.

In the practical application of my invention, I have provided a framing comprising a two part axle consisting of a longitudinally socketed member $a$, having a stub or spindle $a'$ upon which one of the supporting and carrier wheels C is journaled, an opposite member $b$ that has a spindle $b^3$ for receiving the other wheel C' and which has a longitudinal extension $b^2$ that telescopically engages the socket $a^3$ in the member $a$ as clearly shown in the drawings, the said ends $a$ and $b$ and the telescopic portions of the axle being such that when the parts are closed in as shown in Figs. 1 and 3, the two ends $a$ and $b$ abut and form, as it were, a solid axle member of uniform external shape.

In practice, I have found it desirable to proportion the several axle parts so that when closed in, the axle will be approximately nine feet long, and when the parts are drawn out, the axle will be approximately sixteen feet long, leaving a lap of two feet, more or less, in the axle. To hold the axle members from being extended too far and danger of disorganizing the several parts, the axle end has a slot $a^4$ in one side to receive the horizontally projected stop screw $b^4$ on the other axle member as best shown in Fig. 7, and to positively hold the axle members to the closed or extended positions, a strong set screw $d$ is mounted in the lower edge of the axle member $a$ for engaging the slidable axle extension $b^2$ of the member $b$, see Fig. 4.

Each axle member $a$ and $b$ has a pair of forwardly projected clip like brackets $e$—$e$, each pair being in vertical alinement and formed with apertures $e'$—$e'$ to receive the pivot bolts $f$—$f$ to which the inner ends of link arms E—E are conencted and whose outer ends are apertured to receive the bolts F that detachably connect either the bifurcated inner ends $g$ of the shafts G when the draft devices are for a single horse, or similar ends $h$—$h$ formed in the cross bar $h'$ of a tongue H which may be used with rake frame and heads, when it is desired to work the same with a double team, the said tongue having its rear end apertured to receive the bolts I—I that detachably connect the said rear end of the tongue as also the seat post J to the cross or lock bar K, presently again referred to.

By reason of pivotally connecting the arms E to the draft devices in the manner stated, the axle is adapted for being adjusted longitudinally in either direction and yet have a rigid connection with the draft devices under either adjustment, since to the rear end $h^3$ of the tongue H or the rear extension $g^3$ of the shaft's frame, the lock bar K is held fixedly by the bolts I—I. The bar K is disposed horizontally and has its opposite ends passed through elongated slots $e^3$ in the link arms E and at its opposite ends it has stop shoulders, an inner set $k$, and an outer set $k'$, against which the link arms E have lateral bearing, whereby to hold them to a rigid adjustment when the axle is extended, or closed in, as clearly shown in the drawing.

At the opposite front ends of the lock bar K is bolted a cross bar L having vertically projected brackets 2—2 in which is journaled a rock shaft M that carries at each end a fixedly held segmental rack $m$—$m$, each having two notches 5 and 6, and each of which is straddled by the bifurcated ends of rake head adjusting levers N—N, loosely journaled on the shaft M, and having apertures $n$—$n$ to receive the lock pins $n'$—$n'$ adapted to be set to engage with either of the notches 5 or 6 in the racks $m$, for reasons presently explained.

O designates a main lever fixedly mounted on the shaft M, and adjacent the driver's seat P and which is used for raising and lowering the rake heads after they have been adjusted by the levers N—N before referred to.

R—R' indicate a pair of independent rake heads that are arranged to telescopically engage with each other. One of said heads R is a tubular member, provided with a longitudinal slot $r$ that communicates with the socket $r'$, and the said member is provided with forwardly projected ears $r^2$ that journal in the brackets $a^5$—$a^5$ that project rearwardly from the axle member $a$. The other rake head R' has similar ears $r^5$ having pintles $r^6$ that journal in the brackets $b'$—$b'$ projected from the axle member $b$ and the said other rake head R' is also provided with an extension $r^7$ that slides in the socket $r'$ of the other rake head and with a tooth holding flange $r^8$ that slides in the slot $r$ of the head R, as shown. The short head R has a series of rake teeth S of usual form and the long rake head has its tooth carrying flange of such length as to provide sufficient teeth to form a continuous rake head the full width of the machine, when extended, and the said flange is so positioned relatively to the tooth holding portion of the short head to permit its teeth to lap over the teeth on the short head when the parts are closed together, as in Fig. 1. To relieve the rake head levers of the weight of the rake heads when they are lowered to a raking position, a bracket 21 is projected from the short axle member as best shown in Figs. 4 and 6. Each rake head has an upwardly and forwardly projected bracket T—T to each of which is linked a rod U—U which rods are in turn linked to the levers N—N as shown. To lock the head to its elevated position while transporting, a hook 14 is pivoted to the top of axle member $b$ and which is adapted for engaging with a beaded stud 15 on the adjacent bracket T.

From the foregoing description, taken in connection with the drawings, the complete construction and the general operation of the parts will be readily understood. Briefly stated, however, the parts being closed and adjusted for transportation, as in Fig. 1, to adjust the rake for working under its extended or full capacity the member 14 is unhooked from bracket T and the set screw that holds the two axle members together is loosened. The two part axle members are then pulled apart until the set screw engages the end of slot in member $a$ after which the screw is again tightened to hold the axle members firmly to their extended adjustments. The levers N—N are then adjusted with respect to the segments $m$ and are held to their adjustment by properly fitting the pins $n$—$n'$ in the segments $m$, such movement of the levers serving to bring the rake heads down ready for lowering to a raking position, which is done by taking hold of lever O and rocking shaft M to swing their segments $m$ and the levers N—N farther down, whereby, through the link rod connections U—U, to swing the rake heads down until they are supported on the bracket 21.

It should be here stated that the axial relation of the rake heads, the shaft M, the levers N—N, the link connections U and the brackets T is such that when the head is down to its operative or raking position the head is automatically held down and locked, since the pressure against the rake teeth is transmitted to the levers N—N to cause them to tend to further crowd downwardly in the direction indicated by the arrow on Fig. 4.

To close up the rake, the axle clamp or set screw is loosened, the lever O is pulled up to bring levers N—N to notch 5 in racks $m$, after which lock pins are again inserted. The axle members are then shoved endwise until they stop after which the clamp screw is again tightened and the hook 14 is again secured on stud 15. The machine is now ready for traveling from one place to another, through gates and over places where ordinary types of farm wagons may run.

Having thus described my invention, what I claim and desire to secure by Letters Patent, is:—

1. A rake of the character described, comprising an axle formed of telescopic sections, a rake head formed of telescopic sections hingedly secured to the axle sections, draft devices pivotally connected with the telescopic axle members, lever mechanism mounted on the draft devices and connections for joining the said lever mechanism for rocking and raising and lowering the rake head.

2. A rake of the character described, comprising in combination with a wheeled axle, said axle being formed of two telescopic members, rake head sections having telescopic connection, hingedly mounted on the axle members, a draft frame, draft devices link members that join the draft devices with the said axle sections, and means supported on the draft frame, and connected with the rake head section for tilting, raising and lowering the said rake head sections.

3. The combination with the sectional axle, lengthwise adjustable, a two part rake head lengthwise adjustable and hinged on the sectional axle, a draft frame, link arms connecting each side of said frame with the corresponding portions of the axle, and lever mechanism mounted on the draft frame for raising and lowering the rake head sections.

4. The combination with the telescopic axle members, and the telescopic rake head sections hinged to the said axle members; of the draft frame, link arms that join the said frame with the axle members, a means for tilting the rake head sections, mounted on the draft frame, and a lever for actuating the said means to raise or lower the rake head sections.

5. The combination with the axle formed of two members connected to each other, and having longitudinal adjustment, and means for limiting said adjustment outwardly, and a two part rake head hingedly mounted in the axle members; of a draft frame, a link arm connecting each axle member to the draft frame at opposite sides, and lever actuated mechanism mounted on the said frame and connected to the rake heads for raising and lowering the rake head sections.

6. The combination with the axle formed of two endwise adjustable members and the endwise adjustable rake head members hinged thereto; of a draft frame, link arms that join the said frame to the axle members, said frame having stops for locking the said arms from lateral movement when in their opposite adjustments, and lever controlled means mounted on the draft frame, connected with the rake head sections for tilting, and raising and lowering the said rake head sections.

7. The combination with the telescopic axle members, the telescopic heads hinged to the said axle members, a draft frame, and link arms connecting the axle members with the said draft frame, the rake heads having projecting brackets; of a rock shaft mounted on the draft frame, having segments formed with a plurality of notches, straddle levers loosely mounted on the said rock shaft, and adapted to be locked into engagement with either of the notches of the shaft segments, a rocking lever fixedly mounted on the said shaft, and link arms connecting the sector levers with the brackets on the rake members.

8. The combination with the telescopic axle members, the telescopic rake head members hingedly mounted on the said axle members, and a supporting bracket on one of the axle members for sustaining the said rake head sections when in their lowered position; of a draft frame, link arms connecting the axle members with the draft frame, means mounted on the draft frame connected with the rake head sections for raising and lowering the said sections, and a lock device connected with the axle for holding the rake head sections to their raised position.

9. The combination with the telescopic axle and the telescopic rake head sections, hingedly connected to the axle sections, said rake head sections having projecting brackets T; of a draft frame, said draft frame including a transverse bar K, slotted link arms E pivotally connected at one end with the axle sections and pivotally connected at the other end with the draft frame, the ends of said bar K passing through the slots of the said arms E, said bar K having two sets of stop shoulders $k$ and $k'$, a rock shaft M mounted on the said bar K, the notched sectors $m$, the straddle levers $n$ loosely mounted on the said shaft and adapted to be locked into engagement with the sectors, the lever O, and the link members U, having pivotal connection with the brackets T on the rake heads.

HENRY A. SMITH.

Witnesses:
JOHN C. SHELTON,
JAMES E. SCOTT.